UNITED STATES PATENT OFFICE.

EDWARD MARTIN BECK, OF AKRON, OHIO.

GUM FOR VARNISHES, &c.

SPECIFICATION forming part of Letters Patent No. 627,453, dated June 20, 1899.

Application filed July 19, 1897. Renewed November 19, 1898. Serial No. 696,865. (No specimens.)

*To all whom it may concern:*

Be it known that I, EDWARD MARTIN BECK, a citizen of the United States, residing at Akron, in the county of Summit and State of Ohio, have invented certain new and useful Improvements in Gums for Varnishes, &c.; and I do hereby declare the following to be a full, clear, and exact description of the invention, such as will enable others skilled in the art to which it appertains to make and use the same.

This invention is an improvement in varnishes, &c.; and its object is to produce a substitute for the expensive natural resinous gums heretofore employed in the manufacture of varnishes and like compounds.

At present the gums forming the bases of the best varnishes are imported, among these being what are known as "manila" and "kauri" varnish-gums, which are of ancient vegetable origin and are expensive, their price varying according to the color and hardness of the gums. My invention is a substitute for these natural and expensive gums, and is composed of a combination of comparatively inexpensive ingredients, which form a cheap gum suitable for use as a base for varnishes and like compounds instead of the natural gums, so as to lessen the cost of production of the latter, while producing a good, durable, and substantial varnish when combined with the usual oils and driers.

The artificial gum consists principally of rosin and wood-oil combined as hereinafter described, and is to be sold to manufacturers for use as a substitute for the expensive natural gums or to be used in combination therewith, as may be desired. By my invention, therefore, I provide an inexpensive artificial gum or product which may be employed in the manufacture of compounds for finishing and preserving various surfaces and for other purposes for which the natural gums have been used and which will produce a varnish of good quality, possessing high luster and durability at reduced cost.

The invention will be hereinafter more particularly described and then pointed out in the claims at the end of the description.

The method of manufacturing the gum or the proportions of the ingredients composing the same may be varied when desired; but in the manufacture of large quantities thereof I preferably take about five hundred pounds of rosin, which may be placed in a kettle or other suitable receptacle and then heated to about 400° Fahrenheit. To this quantity of melted rosin I may then add about thirty-seven pounds of good quality air-slaked lime for the purpose of hardening, imparting drying qualities, and avoiding granulation of the mass, after which the temperature may be raised to about 525° Fahrenheit, which heat may be maintained for about three hours. To this composition may be added about ten pounds of a suitable drier—such, for instance, as sugar of lead, manganese, or other oxids—and the ingredients thus mixed may be then maintained at the above temperature for about one-half hour longer, after which may be added about one hundred and eighty-eight pounds of wood-oil. The oil used is preferably that obtained from the seeds or nuts of a tree known botanically as *Aleurites cordata*, which is principally grown in China and the adjacent islands, and may be added to the mixture while in the raw state. The addition of the oil brings the temperature of the combined ingredients down to about 425° Fahrenheit, at which time an additional quantity of about eight pounds of air-slaked lime or other suitable ingredient or ingredients which will promote the hardening and drying qualities and prevent granulation may be added and the mixture then boiled at this temperature for about one and one-half hours. During the process of manufacture the mass should be stirred continuously or so frequently as to insure thorough commingling of the ingredients and to prevent burning thereof. This stirring should be continued until the kettle is removed from the fire or the latter extinguished. The heat may now be shut off or the kettle or receptacle removed, so as to permit the mass to cool and harden, when the gum may be removed in any suitable manner for use or for other purposes. The gum resulting from thus mixing rosin and the oil of the *Aleurites cordata* may be sold at less price than the average grades of imported natural varnish-gums heretofore used in the manufacture of varnish.

When my artificial gum is employed in the manufacture of varnish, the cost of the latter is materially reduced and at the same time the beneficial qualities and advantages of the more expensive natural-gum varnish still retained.

I thus provide an inexpensive artificial gum which may be employed as a substitute for the natural varnish-gums in the manufacture of varnishes or other uses which will secure the desired finish and brilliancy of the surface to which it is applied.

In this application I do not claim the process for manufacturing the gum, as such process forms the subject-matter of a separate application, Serial No. 645,141, filed of even date herewith.

It will be understood that in carrying out my invention I may use the ingredients in various proportions, or that I may dispense with the air-slaked lime and oxids or substitute others of equivalent nature in their stead without departing from the spirit of my invention.

Having thus fully described my invention, what I claim as new, and desire to secure by Letters Patent of the United States, is—

1. A gum composed of an oil made from the nuts or seeds of the *Aleurites cordata*, and rosin, substantially as described.

2. As an article of manufacture, a varnish-gum, composed of wood-oil, a suitable drier, and rosin, substantially as described.

3. A varnish-gum composed of an oil made from the *Aleurites cordata*, a suitable ingredient to promote hardening and drying qualities and prevent granulation, a suitable drier, and rosin, substantially as described.

4. As an article of manufacture, a gum comprising an oil made from the seeds or nuts of the *Aleurites cordata*, air-slaked lime, sugar of lead, and rosin in substantially the proportions specified.

In testimony whereof I affix my signature in presence of two witnesses.

EDWARD MARTIN BECK.

Witnesses:
GEO. G. ALLEN,
J. H. McCUNE.